March 13, 1962     J. L. NOLDEN     3,024,926
COMBINED HOIST AND TAILGATE
Filed Dec. 21, 1959     3 Sheets-Sheet 1
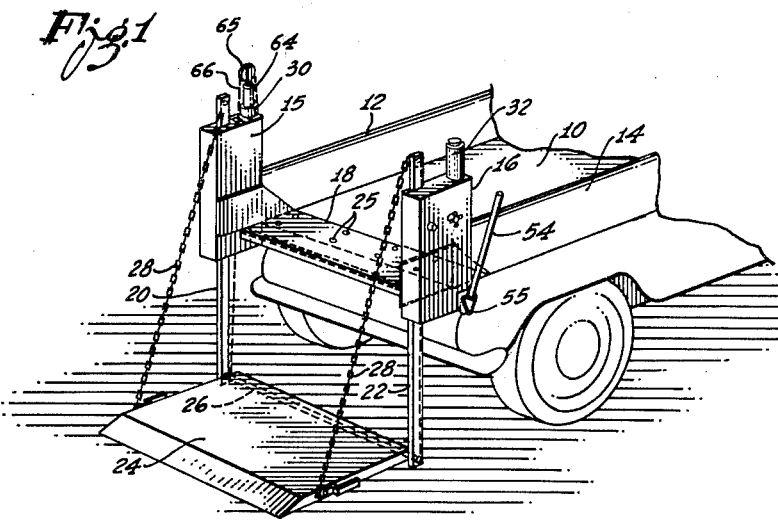
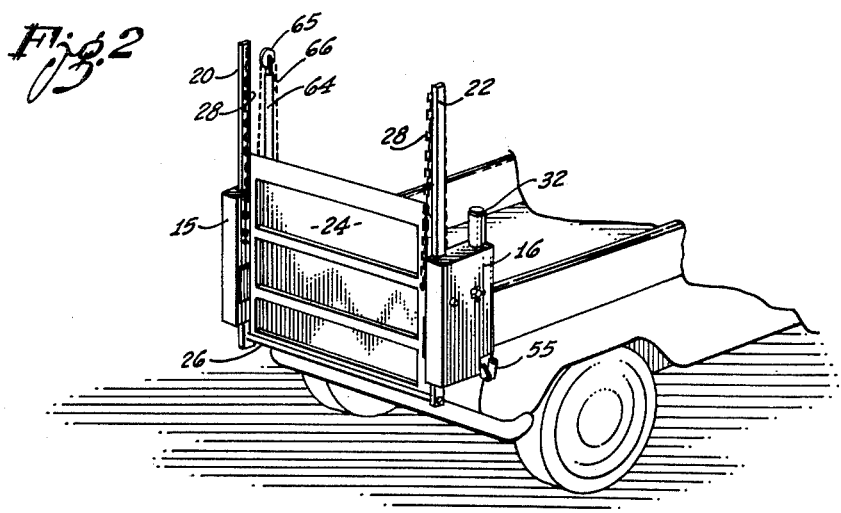
INVENTOR:
John L. Nolden
By Smyth & Roston
Attorneys

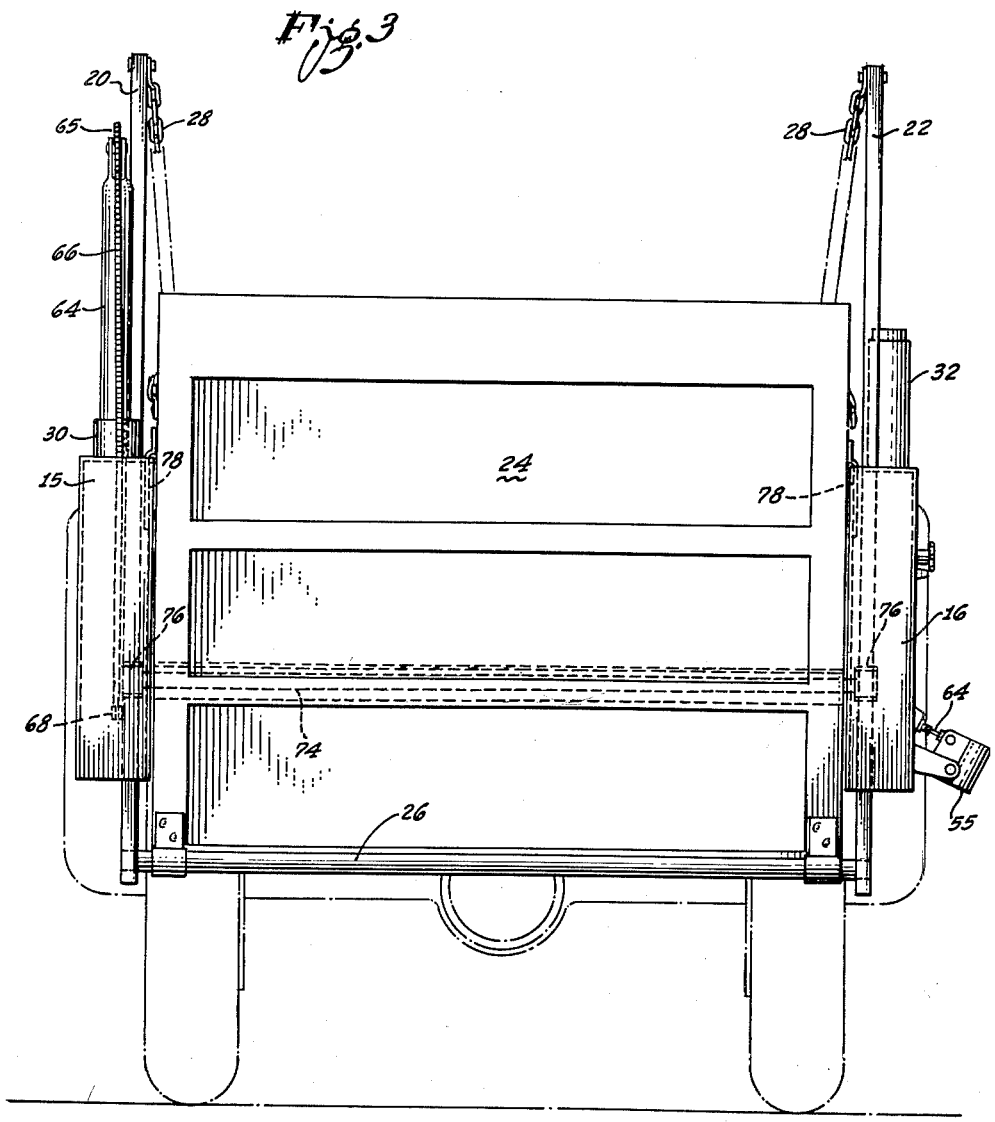

March 13, 1962  J. L. NOLDEN  3,024,926
COMBINED HOIST AND TAILGATE
Filed Dec. 21, 1959  3 Sheets-Sheet 3
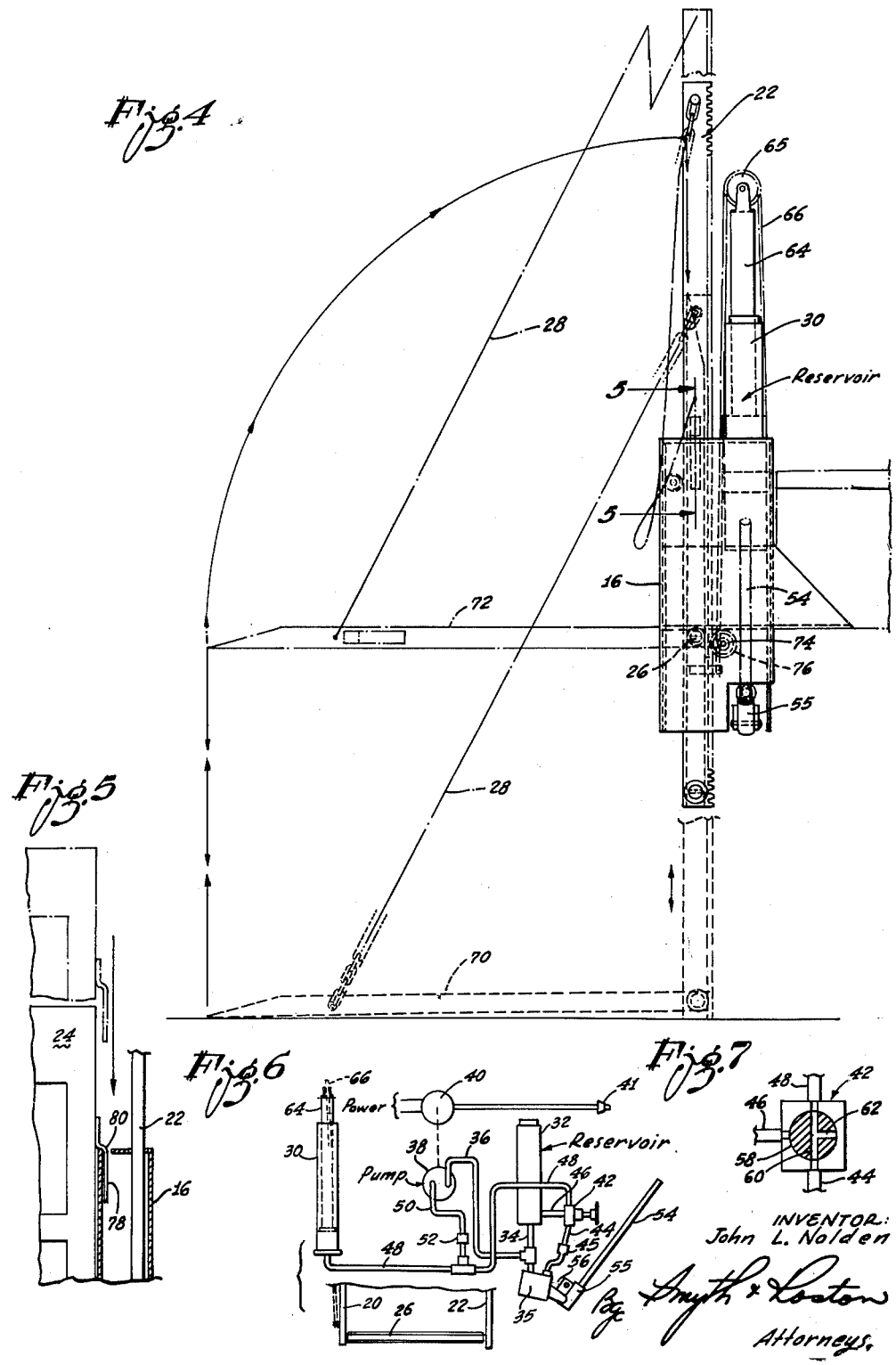

United States Patent Office 3,024,926
Patented Mar. 13, 1962

3,024,926
COMBINED HOIST AND TAILGATE
John L. Nolden, 630 Resolano Drive,
Pacific Palisades, Calif.
Filed Dec. 21, 1959, Ser. No. 860,828
5 Claims. (Cl. 214—75)

This invention relates to an assembly for mounting on the rear end of a truck, both to serve as a hoist for loading and unloading the truck and to serve as a tailgate for the truck.

One problem to which the invention is directed is to embody such an assembly in a unit that may be sold as an accessory for mounting on existing trucks. It is to be understood, however, that the invention may be incorporated in the factory fabrication of a truck.

Another problem is to provide hydraulic means for actuating the hoist and to do so in compact form that blends in appearance with the truck and does not reduce the cargo space of the truck.

These problems are solved by providing a pair of narrow upright housings for mounting on the opposite sides of the rear end of the truck, for example by bolts, and by movably mounting a pair of upright rack bars in the two housings to carry a hoist panel or platform. The hoist platform is hinged to the two rack bars to swing between a horizontal load-bearing position and an upright tailgate position. The two narrow housings may serve as rear end portions of the upright sides of the truck or may serve, in effect, as rearward extensions of the upright sides to increase the cargo space on the truck.

A feature of the invention is the concept of distributing the hydraulic system between the two narrow housings with a hydraulic power cylinder in one of the narrow housings and a hydraulic fluid reservoir in the other narrow housing. It is this concept that solves the problem of finding space on the truck for the additional structure and that makes the invention adaptable to a truck without substantial change in the appearance of the truck.

The hydraulic cylinder is operatively connected directly to the corresponding upright rack bars for raising and lowering the hoist platform. In the preferred practice of the invention, the movement of the two upright rack bars is synchronized by interlocking means comprising a transverse shaft with two pinions thereon meshed with the two rack bars respectively.

Another problem to which the invention is directed is to latch the hoist platform in upright position in a positive manner to serve as a tailgate that may be relied upon to remain secure and to withstand all normal forces encountered in the operation of the truck. A feature of the invention is the solution of this problem by a pair of latch fingers positioned on the opposite sides of the hoist platform to engage upwardly open sockets provided by the two narrow housings. With the hoist platform upright and the two fingers extending downward above the two sockets, the upright platform is lowered to seat the fingers in the two sockets for positive anchorage of the platform in its tailgate position.

The hydraulic means for raising the hoist platform may be either power actuated or manually actuated. In the preferred practice of the invention, both a power actuated hydraulic means and a manually operable hydraulic means are provided in parallel for use selectively. In this regard, a further feature of the invention is a simplified fluid communication system for interconnecting the hydraulic power cylinder, the hydraulic fluid reservoir and the two hydraulic means for actuating the hydraulic cylinder.

The various features and advantages of the invention will be apparent from the following detailed description taken with the accompanying drawings.

In the drawings, which are to be regarded as merely illustrative:

FIG. 1 is a perspective view of a selected embodiment of the invention showing the hoist platform lowered to ground level;

FIG. 2 is a similar perspective view showing the hoist platform in its upright tailgate position;

FIG. 3 is an enlarged elevational view of the same structure also showing the platform in its upright tailgate position;

FIG. 4 is a side elevational view showing the platform at an elevated horizontal position;

FIG. 5 is a fragmentary view partly in elevation and partly in section showing the manner in which a lacthing finger of the platform engages a socket to hold the platform in its tailgate position;

FIG. 6 is a diagram of the hydraulic system employed in the preferred practice of the invention; and FIG. 7 is a diagrammatic representation of a three-way valve employed in the hydraulic system.

FIG. 1 illustrates the presently preferred embodiment of the invention mounted on the rear end of a truck, the bed of the truck having a bottom wall 10 and two upright side walls 12 and 14. The selected embodiment of the invention is in the form of a self-contained unit that is adapted for mounting on the truck. The self-contained unit comprises a left hand upright housing 15 of narrow configuration, a right hand upright housing 16 of similar narrow configuration, a metal plate 18 interconnecting the two housings, two rack bars 20 and 22 mounted in and guided by the two housings 15 and 16, respectively, and a platform 24 that is carried by the two rack bars.

The unitary structure comprising the two housings 15 and 16 and the metal plate 18 is shaped and dimensioned to be attached to the truck bed in the position shown. The plate 18 may be attached to the bottom wall 10 of the truck bed by bolts 25 with the plate extending rearwardly from the rear edge of the bottom wall and the two upright narrow housings 15 and 16 may be bolted to the corresponding side walls 12 and 14 of the truck bed in the same manner. Thus the plate 18 constitutes an end portion or rearward extension of the bottom wall 10 of the truck and the two housings 15 and 16 constitute end portions or rearward extensions of the two side walls 12 and 14, respectively.

The platform 24 may be mounted on the two rack bars 20 and 22 in any suitable manner. In the construction shown, the forward edge of the platform 24 is united with a cross rod 26 by means of which it is pivotally connected to the lower ends of the two rack bars 20 and 22. Two chains 28 extend diagonally from the platform 24 to the upper ends of the two rack bars, respectively, to cooperate with the cross rod 26 for holding the platform horizontal when the platform is used as hoist means to load and unload the truck.

Any suitable hydraulic arrangement may be incorporated in the described unit for raising the platform 24. A feature of this embodiment of the invention is that the hydraulic arrangement includes a hydraulic power cylinder 30 in the left hand housing 15 and includes an upright reservoir 32 in the right hand housing 16 to supply the necessary hydraulic fluid.

The hydraulic arrangement of the preferred embodiment of the invention is shown diagrammatically in FIG. 6. In FIG. 6, a pipe 34 extends from the bottom of the reservoir 32 to the intake of a manually operable pump 35 and a branch 36 from this pipe extends to the intake of a rotary pump 38 that is driven by a power means 40. The power means may be a conventional starter motor which is adapted to be energized by a push button switch 41. The output port of the manually operable pump 35 is connected to a three-way valve 42 by means of a pipe 44 that incorporates a check valve 45. The three-way valve 42 is connected to the reservoir 32 by a pipe 46 and is connected to the hydraulic power cylinder 30 by a pipe 48. The output side of the rotary pump 38 is connected to the pipe 48 by a pipe 50 having a check valve 52.

The manually operable pump 35 is of a well-known type which is manually operable by oscillation of a handle 54. The handle 54 removably fits into a socket member 55 which is hingedly connected to the body of the pump 35 and which is operatively connected to the piston rod 56 of the pump.

The three-way valve 42 is of the general character illustrated diagrammatically by FIG. 7. The valve 42 has a rotary valve member 58 with a diametrical flow passage 60 and a single radial flow passage 62. In the position of the rotary valve 58 shown in FIG. 7, the diametrical passage 60 connects the pipe 44 with the pipe 48, the pipe 46 being cut off. If the rotary valve member 58 is rotated counter-clockwise 90° from the position shown in FIG. 7, the radial flow passage 62 together with one-half of the diametrical flow passage 60 will connect the pipe 48 with the pipe 46, the pipe 44 being cut off.

The hydraulic power cylinder 30 is operatively connected to at least one of the two rack bars 20 and 22 for lifting the hoist platform 24. In the construction shown, for example, the hydraulic power cylinder 30 has an upwardly directed piston rod 64 which carries a sprocket 65 in engagement with a loop of a flexible tension member in the form of a sprocket chain 66. As indicated in FIG. 3, one end of the sprocket chain is connected to the rack bar 20 at a relatively low point thereof by means 68. The other end of the sprocket chain 66 is fixed relative to the truck and for this purpose is anchored inside the left hand housing 15. It is apparent that upward thrust of the piston rod 64 from the retracted position shown in FIG. 1 to the extended position shown in FIGS. 2 and 4 will cause the horizontally extended hoist platform 24 to be lifted from the ground level position indicated by broken lines at 70 in FIG. 4 to the upper position shown in phantom at 72. The upper position is level with the plate 18 and the bottom wall 10 of the truck bed.

Preferably the two rack bars 20 and 22 are mechanically interlocked for movement in unison for the sake of smooth balanced operation. For this purpose, a cross shaft 74 extends between the two housings 15 and 16 on the underside of the plate 18, the shaft being concealed by a downwardly extending flange 75 along the rear edge of the plate. Two pinions 76 are keyed to the cross shaft 74 inside the two housings 15 and 16 in mesh with the two rack bars, respectively. One of the pinions is driven by the rack bar 20 and the other pinion drives the second rack bar 22 in unison therewith.

As heretofore indicated, a feature of the invention is the manner in which the platform 24 may be secured in upright position to serve as a tailgate for the truck bed. As shown in FIG. 1, each of the opposite side edges of the platform 24 is provided with an offset metal strap forming a latch finger 78 which is directed towards the hinged edge of the platform. The two upright housings 15 and 16 provide sockets to receive the latch fingers 78. Thus, as shown in FIG. 5, each of the two housings 15 and 16 may be formed with a socket in the form of a top slot 80 to receive the corresponding finger 78.

The manner in which the present embodiment of the invention serves its purpose may be understood from the foregoing description. FIG. 2 shows the normal upright position of the platform 24 when the platform is serving as a tailgate for the truck bed. The two latch fingers 78 are seated in the two top slots 80 in the manner shown in FIG. 5 to hold the platform in its tailgate position in a positive manner.

When it is desired to employ the platform 24 for loading or unloading the truck, the handle 54 is inserted in the socket 55 for operation of the manual pump 35 to cause the hydraulic power cylinder 30 to act on the sprocket chain 66 to lift the upright platform to an elevation at which the two latch fingers 78 clear the two latch slots 80. The platform 24 is then manually swung rearward to the horizontal position shown at 72 in FIG. 4. To lower the platform 24 from the position 72 to the ground level position 70, it is merely necessary to rotate the valve member 58 of the three-way valve 42 90° counter-clockwise from the position shown in FIG. 7. At the position shown in FIG. 7, the three-way valve 42 connects the pipe 44 to the pipe 48 and thereby operatively connects the manual pump 35 with the power cylinder 30. When the valve member 58 is rotated 90° counter-clockwise, the pipe 48 is placed in communication with the pipe 46 to permit hydraulic fluid to return from the power cylinder 30 to the reservoir 32. Thus rotating the valve member 58 to the new position permits the horizontally extending platform 24 to drop gravitationally to the ground level. The platform drops at a suitably retarded rate because of the inherent dashpot action of the hydraulic system.

To raise the platform 24 from ground level to the level of the truck bed, the valve member 58 of the three-way valve 42 is restored to the position shown in FIG. 7. With the three-way valve member adjusted in this manner, the pump 35 may be actuated by the handle 54 to deliver fluid from the reservoir 32 to the hydraulic power cylinder 30, or the push button 41 may be depressed to cause the pump 38 to be energized by the motor 40 for delivering hydraulic fluid from the reservoir to the power cylinder.

To restore the platform 24 to its tailgate position, the hydraulic cylinder 30 is operated to elevate the platform to the required extent for placing the latch fingers 78 above the slots 80 and then the platform is swung upward from its horizontal position to the upper upright position shown in broken lines in FIG. 5. The three-way valve 42 is then manipulated to permit the platform to gravitate downward for insertion of the latch fingers 78 into the latch slots 80.

My description in specific detail of the selected embodiment of the invention will suggest various changes, substitutions and other departures from my disclosure within the spirit and scope of the appended claims.

1. The combination with a truck with a bed having a bottom wall and two upright side walls, of means for loading and unloading the truck, comprising: a first upright housing and a second upright housing mounted respectively at the rear ends of said two side walls; a first upright rack bar and a second upright rack bar mounted in said two housings respectively and guided thereby; a platform hingedly mounted on said rack bars to swing from a rearward position for supporting objects to an upright position to serve as a tailgate; a flexible tension member formed in an upwardly extending loop with one end of the tension member connected to the first rack bar and the other end anchored relative to the truck; hydraulic means in said first housing to deliver an upward power stroke to said loop for raising said first rack bar thereby raising the platform together with the second rack bar; a reservoir for hydraulic fluid in said second housing; pump means for transferring hydraulic fluid from said reservoir to said power means for actuation thereof; and fluid communication means interconnecting said power means, pump means and reservoir, said fluid communication means including a valve for placing said power means in direct communication with said reservoir to permit downward gravitational movement of said platform.

2. A combination as set forth in claim 1 which includes means mechanically interconnecting said two rack bars for synchronous movement thereof.

3. A combination as set forth in claim 2 in which said means for mechanically interconnecting the two rack bars comprises a transverse shaft below the surface of said bottom wall and two pinions thereon in mesh with the two rack bars respectively.

4. The combination with a truck with a bed having a bottom wall and two upright side walls of means for loading and unloading the truck, comprising: a first upright housing and a second upright housing mounted respectively at the rear ends of said two side walls; a first upright rack bar and a second upright rack bar mounted in said housings respectively and guided thereby; a platform hingedly mounted on said rack bars to swing from a rearward position for supporting objects to an upright position to serve as a tailgate; hydraulic means in said first upright housing to raise the two rack bars in unison; a reservoir for hydraulic fluid in said second upright housing; pump means for transferring hydraulic fluid from said reservoir to said power means for actuating thereof; and fluid communication means interconnecting said power means, pump means and reservoir, said fluid communication means including a valve for placing said power means in direct communication with said reservoir to permit downward gravitational movement of said platform.

5. A combination as set forth in claim 4 which includes a pair of fingers mounted on the opposite side edges of said platform and extending towards the hinged edge of the platform; and in which said two housings provide upwardly opening sockets to receive said fingers respectively whereby with said platform positioned upright with said fingers above the sockets, the upright platform may be lowered by said rack bars to seat said fingers in the sockets for holding the platform in upright position.

References Cited in the file of this patent
UNITED STATES PATENTS

| | | |
|---|---|---|
| 2,497,474 | Snow | Feb. 14, 1950 |
| 2,530,341 | Satsky | Nov. 14, 1950 |
| 2,921,700 | Reed | Jan. 19, 1960 |